UNITED STATES PATENT OFFICE.

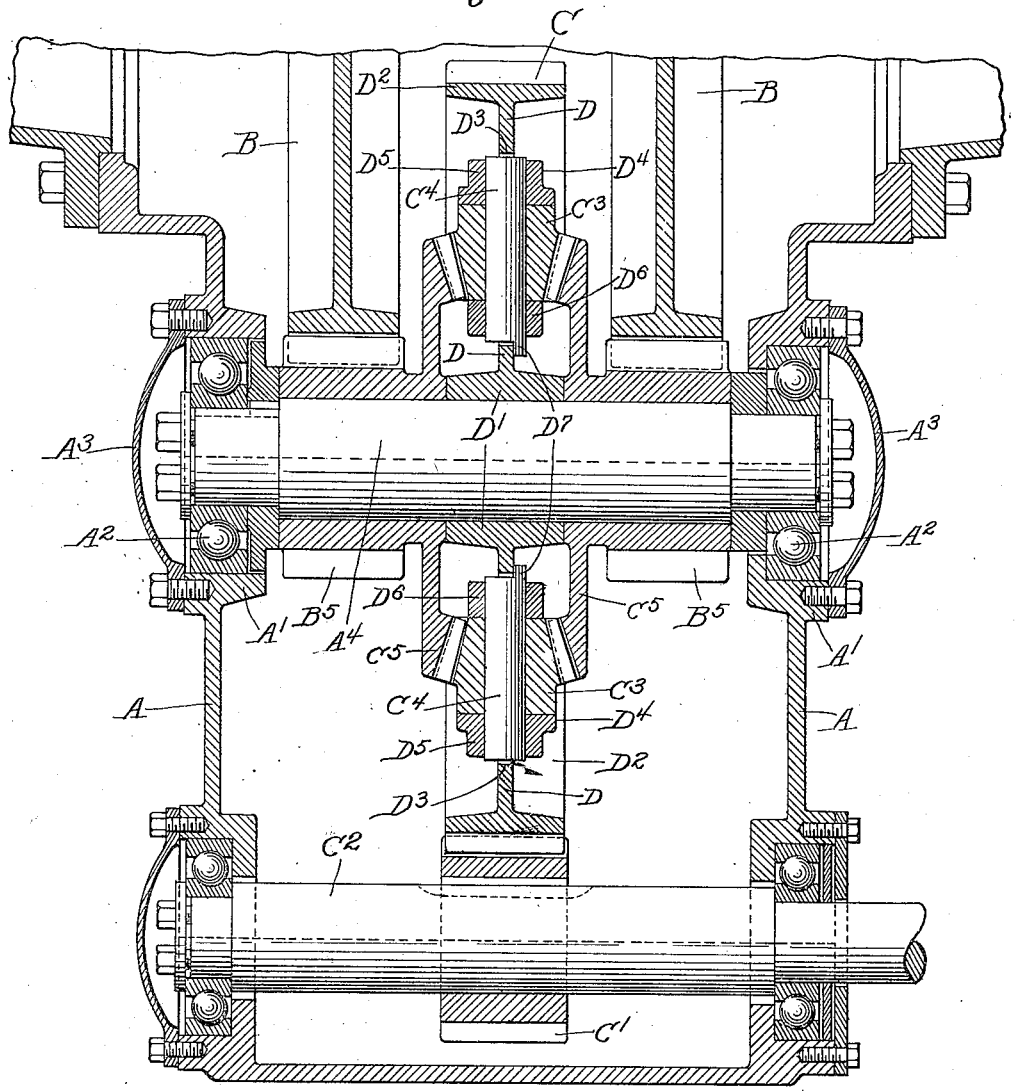
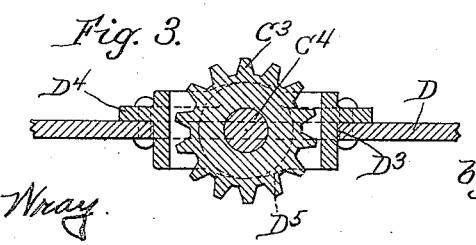

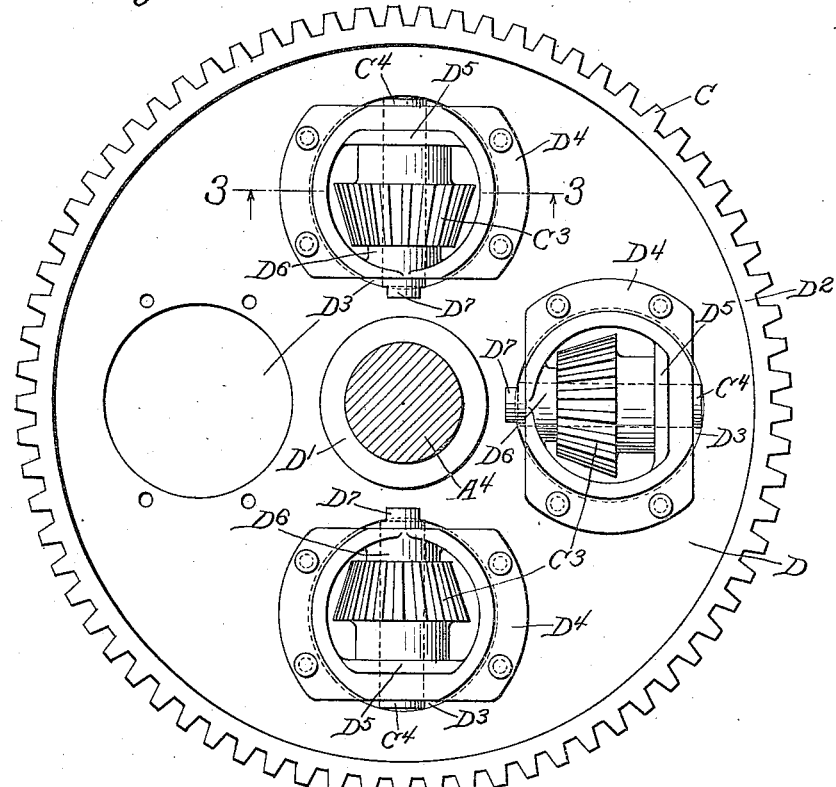
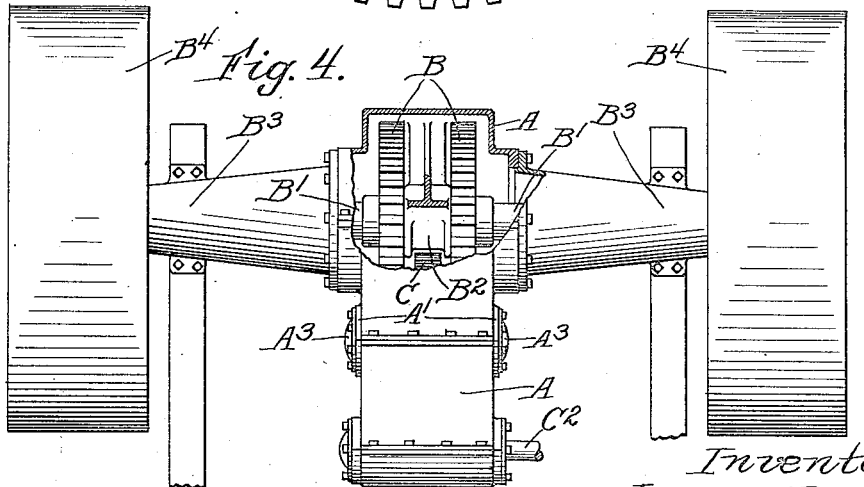

JAMES ROSS, OF LAPORTE, INDIANA, ASSIGNOR TO ADVANCE RUMELY COMPANY, OF LAPORTE, INDIANA, A CORPORATION OF INDIANA.

DIFFERENTIAL.

1,421,834.     Specification of Letters Patent.     Patented July 4, 1922.

Application filed March 9, 1921. Serial No. 450,814.

*To all whom it may concern:*

Be it known that I, JAMES ROSS, a citizen of the United States, residing at Laporte, in the county of Laporte and State of Indiana, have invented a certain new and useful Improvement in Differentials, of which the following is a specification.

My invention relates to improvements in differentials for motor vehicles, particularly for traction engines and similar heavy self-propelled machinery. It has for one object to provide a new and improved form which will be easily and conveniently assembled, rigid in operation, and cheap in cost of construction and repair. Other objects will appear from time to time in the course of the specification.

My invention is illustrated more or less diagrammatically in the accompanying drawings, wherein—

Fig. 1 is a longitudinal section;

Fig. 2 is a side elevation;

Fig. 3 is a section along the line 3—3 of Fig 2;

Fig. 4 is a diagrammatic plan view of the transmission.

Like parts are indicated by like characters in all the drawings.

In view of the fact that the important part of my invention lies merely in the actual assembly and arrangement of part of the differential structure, I have illustrated only enough of that structure to make clear the operation and arrangement of my device and have not gone into the details of the tractor or automobile drive mechanism with which the device is associated further than merely to show enough to indicate how my structure would appear.

A A are fixed frame members having hubs A′ A′ containing ball bearings $A^2$ $A^2$ and closed at the outer ends by caps $A^3$ $A^3$. $A^4$ is a differential shaft mounted in the ball bearings $A^2$ $A^2$.

B B are master gears rotatably mounted on the stub end axle shafts B′ B′, the inner ends of this shaft being supported on the bearing $B^2$ as indicated. The outboard ends rotatably mounted in bearings $B^3$ carry the traction wheels $B^4$. $B^5$ $B^5$ are driving pinions rotatably mounted on the differential shaft $A^4$ in mesh each with one of the master gears B.

C is a differential gear mounted for rotation on the differential shaft $A^4$ in mesh with a driving pinion C′ on the shaft $C^2$ driven by the engine. $C^3$ $C^3$ are a series of differential pinions mounted for rotation upon the radially disposed pins $C^4$ $C^4$ in the differentiating gear. $C^5$ $C^5$ are miter gears arranged on either side of the differential gear and each of them in mesh with all of the pinions $C^3$ $C^3$. These miter gears are preferably integral with the driving gears $B^5$ $B^5$.

This arrangement makes up the usual type of differential in which as long as resistance to rotation of the two master gears is the same, the pressure exerted by the miter gears on opposed sides of the miter pinions balances and so when the differential gear is rotated the two miter gears, the driving pinions, and the master gears all rotate in unison at the same speed but when pressure on one side becomes greater than on the other then the differential action takes place owing to the unbalance of the pressure on opposed sides of the miter pinions. Its action is well known in the art and on this we need no further discussion.

The differential pinion comprises preferably a flat plate D projecting outwardly from the hub D′ and bounded by the rim $D^2$. This plate may be cast integrally or the gear may be built up as the case may be. This plate has a plurality of perforations or apertures $D^3$ $D^3$ and in each one of them is set the supporting box $D^4$ flanged to engage the side of the plate and riveted in position. The pins $C^4$ are introduced lengthwise into the hubs $D^5$ $D^6$ of the supporting boxes, the miter gears being held between the hubs so that as the pin passes through it passes also through the gears. These boxes are then put in place with the lip $D^7$ on the end of each pin resting at one side of the flange D on the hub. The pin is thus held against longitudinal movement by the walls of the aperture $D^3$ and held against rotation by the engagement of the lip $D^7$ with the plate D, and when the parts are once assembled and riveted up, from then on there is no possible chance of displacement of the pin, miter, pinion, box or associated parts.

It is evident that I have shown in my drawings an operative device, still many changes might be made in the size, shape and arrangement of parts without departing from the spirit of my invention.

I claim:

1. In a differential gear a plurality of separate pinion boxes, pinions mounted for rotation therein, and means for separately fastening each of said boxes to the gear.

2. In a differential gear a plurality of separate pinion boxes flanged for attachment to the web of the gear, and pinions mounted for rotation in said boxes.

3. In a differential gear a plurality of separate pinion boxes, pinions mounted for rotation therein, means for separately fastening each of said boxes to the gear, and bearing pins for said pinions carried by the boxes and held against longitudinal displacement therein by engagement with the body of the gear.

4. In a differential gear a plurality of separate pinion boxes flanged for attachment to the web of the gear, pinions mounted for rotation in said boxes, and bearing pins for said pinions carried by the boxes and held against longitudinal displacement therein by engagement with the body of the gear.

5. In a differential gear a plurality of separate pinion boxes, pinions mounted for rotation therein, means for separately fastening each of said boxes to the gear, and bearing pins carried by the boxes upon which the gears are mounted having projections at one end adapted to engage the body of the gear whereby rotation of the pin is prevented.

6. In a differential gear a plurality of separate pinion boxes flanged for attachment to the web of the gear, pinions mounted for rotation in said boxes, and bearing pins carried by the boxes upon which the gears are mounted having projections at one end adapted to engage the body of the gear whereby rotation of the pin is prevented.

7. In a differential gear a plurality of separate pinion boxes, pinions mounted for rotation therein, means for separately fastening each of said boxes to the gear, and bearing pins carried by the boxes upon which the gears are mounted having projections at one end adapted to engage the body of the gear whereby rotation of the pin is prevented, longitudinal displacement of the bearing pins being prevented by engagement at their ends with the body of the gear.

8. In a differential gear a plurality of separate pinion boxes flanged for attachment to the web of the gear, pinions mounted for rotation in said boxes, and bearing pins carried by the boxes upon which the gears are mounted having projections at one end adapted to engage the body of the gear whereby rotation of the pin is prevented, longitudinal displacement of the bearing pins being prevented by engagement at their ends with the body of the gear.

9. In a differential gear means for mounting the miter pinions, comprising a separate flanged pinion box, hubs carried thereby, a pinion located between said hubs and a bearing pin mounted in said hubs upon which the pinion is mounted, the flanges being adapted to engage and be fastened to the web of the gear, the pin being adapted to be engaged by and be held against rotation and longitudinal movement by its engagement with the body of the gear.

Signed at Laporte, county of Laporte, and State of Indiana, this 26th day of February, 1921.

JAMES ROSS.